United States Patent Office 2,780,604
Patented Feb. 5, 1957

2,780,604
MONO (CHLOROMETHYL) STYRENE, ITS DERIVATIVES, AND ION-EXCHANGE RESINS FROM POLYMERS OF AMINATED COMPOUND

John T. Clarke, Newton Highlands, and Allan H. Hamerschlag, Brookline, Mass., assignors to Ionics, Incorporated, Cambridge, Mass., a corporation of Massachusetts No Drawing. Application January 22, 1953,
Serial No. 332,746
9 Claims. (Cl. 260—2.1)

This invention consists in a novel class of chemical compounds referred to hereinafter as halomethylated vinyl aromatic hydrocarbons and which contain the general structure:

(A)
$$RC=CH_2$$
$$|$$
$$Z-CH_2X$$

where

R represents H or $CH_3$, X represents Cl or Br, and Z represents aromatic hydrocarbons of the class consisting of benzene, naphthalene and diphenyl and their nuclear substituted mono and dimethyl derivatives.

This class of compounds includes in particular: Halomethylated styrene, halomethylated isopropenyl benzene, halomethylated divinyl benzene, halomethylated diisopropenyl benzene, halomethylated vinyl naphthalene, halomethylated isopropenyl naphthalene, halomethylated vinyl diphenyl, halomethylated isopropenyl diphenyl, and their nuclear substituted mono- and di-methyl derivatives.

The invention also relates to the preparation of useful materials from compounds containing the general structure A, including in particular the quaternization products of halomethylated vinyl aromatic hydrocarbons containing the general structure (B)
$$RC=CH_2 \quad \begin{bmatrix} R_1 \\ | \\ Z-CH_2\overset{+}{N}-R_2 \\ \diagdown R_3 \end{bmatrix} Y-$$

where $R_1$, $R_2$, and $R_3$ represent hydrocarbon residues, Y is an anion, R and Z representing the same class of compounds noted above in A. This invention also relates to polyelectrolytes (soluble linear polymers) containing the structure represented by Formula B. Such polyelectrolytes may be in the form of soluble linear polymers or copolymers, or in the form of insoluble cross-linked copolymers such as granules useful in ion-exchange processes, or solid structures of controlled geometry and dimensions, including membranes useful in electrodialysis processes.

Halomethylated vinyl aromatic hydrocarbons, and especially their quaternization products, have been found to be particularly useful in the preparation of polyelectrolytes, that is, polymeric materials containing dissociable electrolytic groups. These compounds polymerize or copolymerize in the manner of styrene and may accordingly be advantageously used in the preparation of stable polymeric materials containing the halomethyl group $$-CH_2X$$

or quaternary ammonium groups

Polymers containing halomethyl groups may be reacted with tertiary amines to convert the halomethyl groups to quaternary ammonium groups according to the general reaction equation (1)  $-CH_2X + R_3N \longrightarrow -CH_2NR_3]x-$ Preferably, however, polymers containing quaternary ammonium groups are prepared from monomeric quaternization products represented by Formula B.

Polymeric structures containing both of these groups have been prepared in the prior art, but by the process of first polymerizing or copolymerizing a vinyl aromatic hydrocarbon, and then halomethylating the polymer. In such a process, however, it is extremely difficult to obtain a polymer in which all of the monomeric units have been halomethylated especially where an insoluble cross-linked polymeric material is to be produced. In the case of linear soluble polymeric materials, halomethylation has been attempted, and has been found to lead to the formation of an insoluble gel, probably because some cross-linking occurs. See for instance, G. D. Jones, I. E. C. 44, 2686 (1952).

Polymers containing the quaternary ammonium salts of halomethylated aromatic hydrocarbons have also been prepared by the process of reacting the halomethylated polymer described in the preceding paragraph with a tertiary amine. Here again, all the monomeric units, or even all the units that have been halomethylated, are not quaternized and, as in the case of halomethylation, the quaternization of soluble linear polymers results in the formation of insoluble gels.

Accordingly, the processes of the prior art have not been entirely satisfactory. The production of soluble linear polymers containing halomethylated vinyl aromatic hydrocarbons or quaternized halomethylated vinyl aromatic hydrocarbons has not been possible, and in the production of insoluble cross-linked polymers containing these groups, the processes heretofore known have limited the degree to which halomethylation and quaternization can be carried out.

The present invention accordingly includes the preparation of halomethylated vinyl aromatic hydrocarbons and their quaternization products; and the preparation therefrom of soluble and insoluble polyelectrolytes.

PART I.—PREPARATION OF HALOMETHYLATED VINYL AROMATIC HYDROCARBONS

Materials of this class represented by the structure of Formula A may be prepared by a novel combination of steps which are each well known in the art. Generally the starting material is a compound of the group consisting of ethyl benzene, diethyl benzene, ethyl naphthalene, ethyl diphenyl, isopropyl benzene, diisopropyl benzene, isopropyl naphthalene, isopropyl diphenyl and their nuclearly substituted monomethyl and dimethyl derivatives. These starting materials are hereinafter referred to as ethyl substituted aromatic hydrocarbons. The halomethyl group may be incorporated on the aromatic nucleus, for example, by reacting one of the above ethyl aromatic hydrocarbons with paraformaldehyde and hydrogen halide, bromo- or chloro-methyl ether may be used, either in concentrated form or diluted with inert solvents such as di(chloroethyl) ether.

Preferably following the halomethylation, but also prior to this step, the ethyl (or isopropyl) substituents are monohalogenated by well known techniques and preferably on the alpha carbon. For this monohalogenation, reaction with the elemental halogen (bromine or chlorine) under strong illumination is preferred, although other well known methods of monohalogenation of alkyl substituents may be used. If the ethyl aromatic hydrocarbon is one or more of the following:

Ethyl benzene
Isopropyl benzene
Diethyl benzene
Diisopropyl benzene
Ethyl naphthalene Isopropyl naphthalene
Ethyl diphenyl
Isopropyl diphenyl the product of the halomethylation and monohalogenation will be respectively:

Halomethylated (haloethyl) benzene
Halomethylated (haloisopropyl) benzene
Halomethylated di-(haloethyl) benzene
Halomethylated di-(haloisopropyl) benzene
Halomethylated (haloethyl) naphthalene
Halomethylated (haloisopropyl) naphthalene
Halomethylated (haloethyl) diphenyl
Halomethylated (haloisopropyl) diphenyl In the event that the starting material is a nuclear-substituted monomethyl or dimethyl derivative of the ethyl aromatic hydrocarbons listed above, it is only necessary to monohalogenate the ethyl (or isopropyl) and methyl substituents (preferably with the elemental halogen under strong illumination as described above) to obtain similar halomethylated haloethyl aromatic compounds. Thus ethyl toluene yields, for example, chloromethyl (alpha chloroethyl) benzene. In the event that an extraordinarily high level of halomethylation is desired, a methyl ethyl aromatic hydrocarbon of the class described above may be first halomethylated by the Friedel-Crafts reaction and the alkyl groups then monohalogenated. Ethyl xylene is such a starting material.

The extent of halomethylation by the Friedel-Crafs procedure may be controlled by the choice of type and concentration of catalyst, temperature and concentration of active reagents to produce, for example, mono- or di-halomethylation depending upon the ultimate use of the material. It will be understood however that multiple halomethylated compounds are contemplated within the scope of this invention and may be prepared as generally described above and illustrated in the examples below.

Throughout the specification and in the claims the starting materials referred to above are referred to as ethyl substituted aromatic hydrocarbons. It will be understood, however, that this designation includes compounds such as isopropyl toluene and isopropyl diphenyl.

The halomethylated halogenated ethyl aromatic hydrocarbons produced as described above are then dehydrohalogenated in a manner well known in the art, preferably by heating at an elevated temperature and preferably under reduced pressure—with or without the presence of a dehydrohalogenation catalyst—to produce the halomethylated vinyl aromatic hydrocarbons (A). In an alternate procedure the halomethylated ethyl aromatic hydrocarbon may be catalytically dehydrogenated in the vapor phase to produce compound (A).

The equation representing the above procedures may be written as follows for the typical starting material isopropyl toluene:

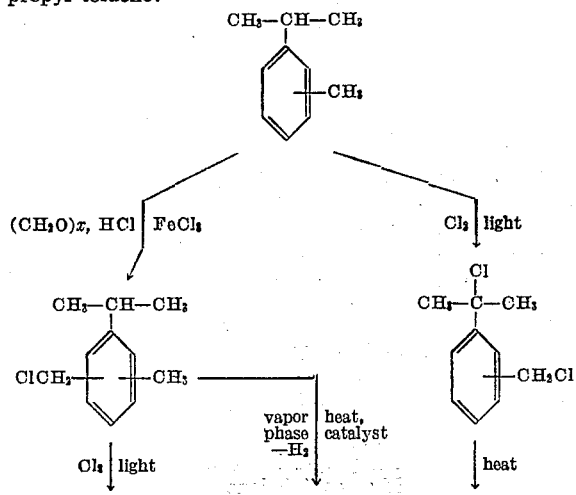

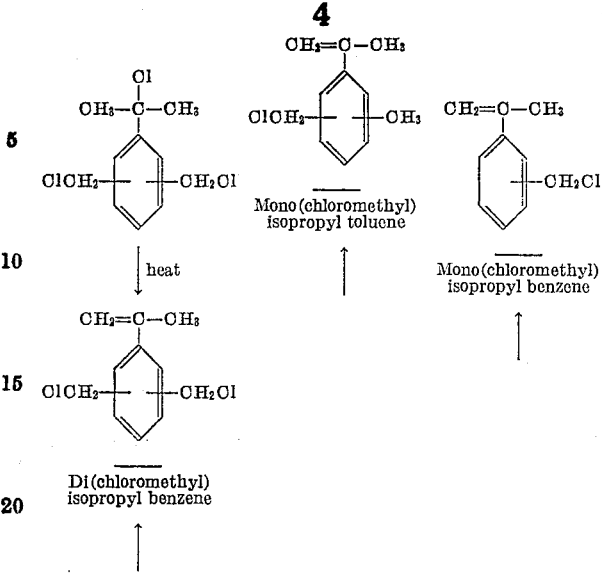

Methods of carrying out halomethylation are well known in the art, and are discussed in "Organic Reactions," vol. I, chapter 3 (John Wiley & Sons, Inc. N. Y. C., 1942). The steps of monohalogenation of ethyl or isopropyl substituents followed by dehydrohalogenation are described in Boundy-Boyer, Styrene, Its Polymers and Derivatives, Reinhold Pub. Co., 1952. The corresponding naphthalene, or diphenyl compounds may be similarly prepared by starting with the ring substituted ethyl or isopropyl derivative, which in turn may be prepared, for example, by reacting the unsubstituted aromatic material with ethyl chloride according to the Friedel-Crafts reaction.

Although halomethylated vinyl benzenoid hydrocarbons having the structure A, are generally useful in this invention, mono(chloromethyl) styrene is of primarily importance since it is most readily prepared, and may be considered as representative of this class of compounds. Accordingly this invention is further described as it pertains specifically to mono(chloromethyl) styrene.

Mono(chloromethyl) styrene may conveniently be prepared, for example, by first chlorinating ethyl toluene in the presence of light to produce chloroethyl chloromethyl benzene and then dehydrochlorinating that to produce mono(chloromethyl) styrene, according to the reaction (3)

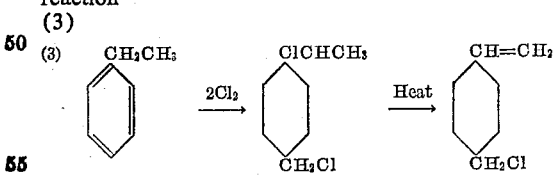

The steps involved are described generally by Boundy-Boyer (supra).

A convenient laboratory process consists in chloromethylating ethyl benzene, brominating the chloromethylated material and dehydrobrominating the brominated compound as described above in general (see reaction 2 supra).

*Example I*

Preparation of halomethylated vinyl benzene compound.

In a 3-necked flask equipped with a stirrer and gas inlet tube was placed 800 cc. (6.4 mols) ethylbenzene, 60 grams paraformaldehyde (2 mols), and 40 grams anhydrous zinc chloride (0.29 mol). Anhydrous HCl gas was admitted to the stirred suspension at 60–70° C. for about one hour and saturation was achieved in about twenty minutes. After cooling, the lower layer was separated and discarded. The upper layer was thoroughly washed in water and dried over $CaCl_2$ and distilled. Two hundred and twenty grams of chloromethyl-ethylbenzene, B. P. 95–101 (11 mm.)

(70% yield based on formaldehyde) were obtained. The purity of this product was found to be 99.5% by halide content (titration of the reaction product of methanolic trimethylamine by silver nitrate).

Two hundred and twenty grams of chloromethylethylbenzene were dissolved in 500 cc. of carbon tetrachloride and the mixture was heated to boiling. An equimolar quantity of bromine was slowly introduced by means of a dropping funnel while the mixture was strongly illuminated by means of a photoflood bulb placed a few inches from the flask. HBr was vigorously evolved. The mixture was allowed to cool and then washed well with water and dried over $CaCl_2$.

The carbon tetrachloride was first removed by distillation at atmospheric pressure and then after the addition of a stabilizer (dry Amberlite IR-45, a weakly basic ion-exchange resin) the residue was dehydrohalogenated by fractionation at 20 mm. pressure while under partial reflux in a glass helix-packed column. The crude product flashed out of the reaction zone as soon as it was formed and the collected distillate was found to be about 60% dehydrohalogenated (bromine titration). A fractional distillation in the presence of an inhibitor gave 170 grams (80% yield) of mono(chloromethyl) styrene, B. P. 92–96 (10 mm.) of 97% purity (bromine titration).

PART II.—PREPARATION OF THE QUATERNARY AMMONIUM SALTS OF HALOMETHYLATED VINYL BENZENE COMPOUNDS.

This compound, represented by Formula B, is prepared by reacting the halogenated vinyl aromatic hydrocarbon with a tertiary amine, preferably in solution, and the reaction proceeds readily merely upon mixing the reactants together. The reaction may be represented by the equation:

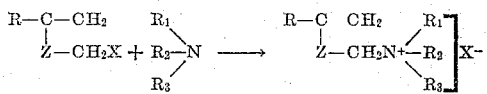

from which it will be seen that the groups $R_1$, $R_2$ and $R_3$, which may be the same or different hydrocarbon groups, represent hydrocarbon residues. Suitable tertiary amines include trimethyl amine, triethylamine, dimethyl ethyl amine, tricyclohexyl amine, triethanol amine, dimethylethanol amine, diethyl cyclohexyl amine, triphenyl amine, benzyl phenyl methylamine, benzyl dimethyl amine and the like. Ammonia and organic primary or secondary amines may be used to produce respectively primary, secondary and tertiary amines if these are desired rather than the generally preferred quaternary ammonium salts.

*Example II*

Mono (chloromethyl) styrene was dissolved in ether and anhydrous trimethylamine was admitted while keeping the mixture cold. A white sticky precipitate formed which was separated from the ether and dissolved in a small quantity of absolute methanol. Ether was then added, the mixture cooled and an 85% yield of crystals of the salt were deposited after several hours. It was dried over $P_2O_5$ in a desiccator and was found to be 100% pure (chloride titration).

PART III.—PREPARATION OF LINEAR SOLUBLE POLYELECTROLYTES

Linear soluble polyelectrolytes containing the structure represented by Formula B may be prepared by polymerizing quaternary ammonium salts of halomethylated vinyl benzenoid hydrocarbons either alone (homopolymerization) or with monovinyl aromatic compounds or other monofunctional ethylenic compounds copolymerizable with styrene (copolymerization). Polymerization of the quaternary ammonium vinyl aromatic salts occurs under the same conditions effective for the polymerization of styrene, and the salt may be copolymerized with those materials copolymerizable with styrene, including styrene, ethyl vinyl benzene, vinyl naphthalene, alpha methyl styrene, isopropenyl benzene, butadiene, methyl methacrylate and similar well known vinyl compounds with which styrene copolymerizes to form linear polymers. Polymerization, or copolymerization, may be carried out by any of a number of well known methods, for instance, the polymerizable ingredients may be mixed and polymerized en masse, or they may be polymerized while suspended as an emulsion in a liquid medium. Particularly satisfactory results are attained by dissolving the ingredients in a common solvent therefor, and carrying out the polymerization in solution.

Preferably the polymerization is accelerated by well known so-called free radical catalysts such as 2 azo-bis-isobutyronitrile or organic peroxides, e. g. benzoyl peroxide, and by carrying out the polymerization at an elevated temperature.

Halomethylated divinyl benzene or diisopropyl benzene and similar bifunctional ethylenic halomethylated benzeneoid hydrocarbons may not be used of course to produce linear polyelectrolytes.

Soluble polyelectrolytes thus produced are useful as mordants or as precipitating agents for negatively charged colloids. They have also been found to possess bacteriostatic properties and are film forming. Thus, bacteriostatic films may be cast from their aqueous solutions.

*Example III*

Four grams of the salt, vinylbenzyl trimethylammonium chloride, prepared as in Example II, and 0.1 gram 2-azo-bis-isobutyronitrile were dissolved in 20 cc. methanol and the mixture was heated in a stoppered vessel for twenty hours at 65° C. An aliquot was titrated with bromine in aqueous acetic acid and from the titer it was estimated that 97% of the monomer had polymerized. The polymer was isolated by precipitation with acetone and dried over sulfuric acid. A sample, if baked at 110° C., was found to insolubilize. After correction had been made for volatiles content (10%) the polymer was found to be at least 98% pure. (Mohr chloride titration.)

Chloromethylstyrene monomer can be polymerized readily under similar conditions to yield a linear poly(chloromethylstyrene). This polymer can be converted readily to the polyquaternary ammonium salt similar to that described above.

If polyelectrolytes of higher molecular weight are desired, they may be formed by copolymerization of the halogenated vinyl aromatic hydrocarbon, or the quaternary salt thereof, with styrene or other mono-vinyl compounds copolymerizable with styrene.

PART IV.—PREPARATION OF INSOLUBLE CROSS LINKED POLYELECROLYTES

Insoluble cross-linked polyelectrolytes are prepared in the same manner as soluble linear copolymers discussed above, except that a polyvinyl compound, that is, a compound having two or more copolymerizable $CCH_2$ groups (including divinyl benzene, di-isopropenyl benzene, ethylene glycol dimethacrylate, etc.) is used instead of all or part of the mono vinyl compound with which the halomethylated vinyl aromatic hydrocarbon or its quaternary salt may be copolymerized. As with the linear copolymers, the cross-linked polyelectrolyte may be formed directly from the quarternary salt or by copolymerizing the halomethylated vinyl aromatic hydrocarbon and treating the insoluble polymer with a tertiary amine to convert the halomethyl groups to quaternary ammonium groups. Such post-quaternization is preferably carried out with the copolymer in a solvated condition which may be produced either by effecting copolymerization in the presence of solvent or by swelling the copolymer prior to treating it with the tertiary amine, for example, by soaking it in a liquid which is a solvent for the monomeric material, such as benzene or toluene.

It will be understood that the degree of cross linking controls the amount by which the copolymer swells in the presence of solvating liquids, and hence affects the ultimate hardness and durability of the insoluble polyelectrolyte. The polyvinyl aromatic compound should constitute on a molar basis, at least 0.1% of the mixture of polymerizable ingredients, and best results are realized with from 15–50 percent polyvinyl aromatic compound.

Solid insoluble polyelectrolytes in the form of coherent self-sustaining structures of controlled geometry, such as membranes, may be readily produced in accordance with this invention. Such structures are solvated gels which have as a skeletal structure an insoluble infusible polymeric mixture that includes aromatic nuclei having dissociable quaternary ammonium salt groups. The dissociable salt groups distributed throughout the matrix impart to the structures a fixed cationic charge electrostatically associated with a mobile replaceable anion. These materials thus exhibit anion exchange characteristics and in addition are selectively permeable and electrically conductive. To produce solid insoluble polyelectrolytes of exceptionally high capacity it is desirable to use for the crosslinking polyvinyl compound halomethylated divinyl benzene or halomethylated diisopropenyl benzene (prepared, for example, according to the procedure of Example I above) or their quaternary ammonium derivatives.

In addition to the electrical properties these materials are mechanically durable and substantially hydraulically impermeable, and may thus be formed into membranes useful as hydraulic separators, particularly in the field of electrodialysis, for instance in the processes and apparatus disclosed in the following copending applications: Walter Juda and Wayne A. McRae, Ser. No. 146,706, filed February 28, 1950; Walter Juda and Wayne A. McRae, Ser. No. 207,289, filed January 23, 1951; Davis R. Dewey and Edwin R. Gilliland, Ser. No. 213,514, filed March 2, 1951; and William E. Katz and Norman W. Rosenberg, Ser. No. 300,302, filed July 22, 1952.

In general, such self-sustaining structures are produced by combining the polymerizable ingredients in a common solvent for them, disposing the solution to the desired form (as by casting it in a mold), and effecting polymerization under conditions preventive of the evaporation of solvent. The polymerization thus proceeds in solution to form an insoluble infusible cross linked matrix that uniformly permeates the mass of solution and occludes the solvent as the liquid phase of a coherent homogeneous gel. The polymeric matrix is thus formed to accommodate the liquid phase and is not swollen by it, resulting in a highly solvated gel having an unstressed matrix. The prevention of the escape of solvent during polymerization is an important feature, in the production of self-sustaining structures, as it is necessary for the formation of a continuous gel free of fractures.

Preferably the copolymeric structure is formed directly from the monomeric quaternary ammonium salt and the copolymerizable polyvinyl compound, but when prepared from the halomethylated vinyl aromatic hydrocarbon, the gel structure is subsequently quaternized by treating it with a tertiary amine.

The polymerizing ingredients are preferably combined in the following proportions:

|   | Mols |
|---|---|
| Copolymerizable polyvinyl compound | 1 |
| Halomethylated vinyl benzenoid hydrocarbon or the quaternary ammonium salt thereof | 1–3 |
| Copolymerizable monovinyl compound | 0–1 | along with a catalyst, from 20 to 70, and preferably about 50, percent solvent, by volume based on the total volume.

In forming membranes, the polymeric gel may advantageously be formed on a reinforcing web of paper, felt, fabric or the like, by placing the web on a flat casting surface, pouring the solution over it, then covering the cast and heating the solution until polymerization is complete. The gel is thereafter cooled and may then be leached in water to convert it to an aqueous gel and to remove adsorbed unused reactants. It may thereafter be converted to other salt forms by leaching it in solutions of the desired anions, such as sulfate, nitrate or hydroxide.

The following examples demonstrate the two preferred methods of forming membranes.

*Example IV*

| | |
|---|---|
| Vinyl benzyl trimethyl ammonium chloride __grams__ | 12.3 |
| Divinyl benzene, commercial 76% alkali washed ____do____ | 2.85 |
| Methanol ____cc__ | 12 |
| 2-azo-bis-isobutyronitrile ____gram__ | 0.1 |

The vinyl benzyl trimethyl ammonium chloride was prepared according to Example II. The divinyl benzene was the commercial 76% product obtainable from Dow Chemical Company, Midland, Michigan. Analysis by bromine titration indicated that this material contained 12.6 millimols of unsaturation per cc. It was washed with alkali to remove the polymerization inhibitor (1000 p. p. m. of tertiary butyl catechol). The ingredients were mixed thoroughly and cast between two glass plates 0.1 cm. apart on a polystyrene-bonded glass surfacing mat 15 mils thick (obtainable from the Owens-Corning Fiberglas Corporation, Toledo, Ohio). The cast was baked at 60–65° F. for twenty hours.

During polymerization, evaporation of solvent into the space between the plates beyond the area occupied by the cast occurred only at the edges of the cast. The dried edges sealed the interior of the cast from additional evaporation of solvent. The dried edges were trimmed off and discarded after polymerization and cooling of the membrane.

After polymerization the cast was removed and leached in methanol and then in water. The properties of this membrane are listed in Table I.

*Example V*

| | |
|---|---|
| Mono(chloromethyl) styrene ____cc.__ | 15 |
| Divinyl benzene, commercial 76% alkali washed cc.__ | 7.8 |
| Diethyl benzene ____cc.__ | 23 |
| Benzoyl peroxide ____gram__ | 0.1 |

The mono(chloromethyl) styrene was prepared according to Example I. The ingredients were mixed thoroughly and cast between two glass plates 0.1 cm. apart on a polystyrene-bonded glass surfacing mat 15 mils thick. The cast was baked for 4 hours at 85° C., cooled and then leached thoroughly in methanol and reacted for four hours at room temperature with a 25% solution of trimethylamine in methanol. The resulting membrane was leached with distilled water. The properties are listed in Table I.

TABLE I

| Example | IV | V |
|---|---|---|
| Conductivity, ohm$^{-1}$cm.$^{-1}$×10$^3$ | 18 | 4 |
| Capacity, meq. wet gram | 2.0 | 1.2 |
| Concentration, E. M. F., mv | 12 | 10 |
| Water Content, percent by weight | 51 | 43 |

The ion exchange capacity was determined by bringing a specimen of the membrane into equilibrium with a 1.0 N sodium chloride solution, then leaching it repeatedly in distilled water to remove the excess sodium chloride. The specimen was then soaked in a 1.0 N sodium nitrate solution, thereby replacing the chloride ions with nitrate ions and this solution was titrated for removed chloride. The capacity is expressed as the number of milliequivalents of chloride removed by the nitrate per gram of surface-dried material.

The electrical conductivity was measured by forming a strip in the leached chloride form 10 cm. long, 1 cm. wide and 0.1 cm. thick, clamping the ends to copper electrodes and measuring the resistance of the strip to 60 cycle alternating current. The conductivity is the reciprocal of the resistance.

The concentration potential was measured in a concentration cell with a specimen of the membrane separating 0.60 N aqueous sodium chloride solution and a 0.30 N aqueous sodium chloride solution. The electrodes were saturated calomel electrodes connected to the sodium chloride solution by means of saturated potassium chloride salt bridges. The membrane was brought into equilibrium with a 0.60 N aqueous sodium chloride solution prior to its insertion in the cell. The respective solutions in the cell were continuously renewed to maintain their concentrations. The value recorded is the absolute value of the open circuit potential after steady conditions were attained. In such a cell, the absolute value of the thermodynamically ideal potential is 17 mv. It will be seen that this standard was approached.

Granular ion exchange resins may also be produced in accordance with this invention by the same technique used for the production of membranes, except that, because fracturing of the copolymer is unimportant, conditions preventive of the escape of solvent during polymerization need not be established. Polymerization may be carried out en masse, or the polymerizable ingredients may be mixed and suspended as an emulsion in a liquid medium. The proportions and conditions described above with reference to the production of self-sustaining structures of controlled geometry, are entirely satisfactory for the production of granular ion exchange resins. If desired, self-sustaining structures may even be comminuted to granular form.

As ion exchange resins, the insoluble polyelectrolytes of this invention are strongly basic when in the hydroxide form, and may be used to replace anions in solution with hydroxyl ions. For instance, by contacting sodium chloride solution with such a resin in the hydroxide form, a solution of sodium hydroxide is produced.

Having thus disclosed our invention and described in detail preferred and representative embodiments thereof, we claim and desire to secure by Letters Patent:

1. A synthetic organic vinyl aromatic compound having the structure

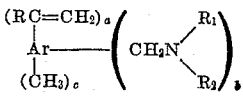

where Ar is an aromatic hydrocarbon selected from the group consisting of benzene, naphthalene and diphenyl, R is a substituent selected from the group consisting of hydrogen and methyl, $R_1$ and $R_2$, are selected from the group consisting of hydrogen and hydrocarbon, $a$ is an integer of from 1 to 2, $b$ is an integer of 1 to 3, and $c$ has a value from 0 to 2.

2. A synthetic organic vinyl aromatic compound having the structure

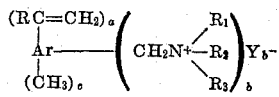

where Ar is an aromatic hydrocarbon selected from the group consisting of benzene, naphthalene and diphenyl, R is a substituent selected from the group consisting of hydrogen and methyl, $R_1$, $R_2$, and $R_3$ are selected from the group consisting of hydrogen, hydrocarbon and hydroxyl substituted aliphatic hydrocarbon groups, $a$ is an integer of from 1 to 2, $b$ is an integer of 1 to 3, $c$ has a value from 0 to 2, and $Y^-$ is an anion.

3. A method of making aminated halomethyl styrene comprising reacting a compound from the group consisting of chloromethyl styrene and its nuclear methyl derivatives with an amine of the group consisting of ammonia, and organic primary, secondary, and tertiary amines.

4. The method of forming solid insoluble polyelectrolytes in the form of sheets or membranes, comprising combining a compound having the structure

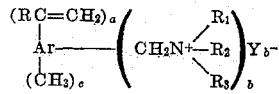

where Ar is an aromatic hydrocarbon selected from the group consisting of benzene, naphthalene and diphenyl, R is a substituent selected from the group consisting of hydrogen and methyl, $R_1$, $R_2$, and $R_3$ are selected from the group consisting of hydrogen and hydrocarbon and hydroxyl substituted aliphatic hydrocarbon groups, $a$ is an integer of from 1 to 2, $b$ is an integer of 1 to 3, $Y^-$ is an anion, and $c$ has a value from 0 to 2, with a polyvinyl aromatic compound copolymerizable with styrene in a common solvent, disposing the solution to the form of a sheet, and polymerizing the solute under conditions preventive of the escape of solvent.

5. The method of forming solid insoluble polyelectrolytes in the form of sheets or membranes comprising reacting mono(chloromethyl)styrene with a tertiary amine, combining the reaction product with a polyvinyl aromatic compound copolymerizable with styrene in a common solvent, disposing the solution to the desired form, and polymerizing the solute under conditions substantially preventive of the escape of solvent.

6. A solid insoluble infusible polyelectrolyte in the form of sheets or membranes comprising a copolymer of a compound having the structure

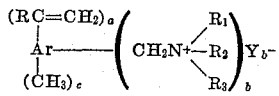

where Ar is an aromatic hydrocarbon selected from the group consisting of benzene, naphthalene and diphenyl, R is a substituent selected from the group consisting of hydrogen and methyl, $R_1$, $R_2$, and $R_3$ are selected from the group consisting of hydrogen, hydrocarbon and hydroxyl substituted aliphatic hydrocarbon groups, $a$ is an integer of from 1 to 2, $b$ is an integer of 1 to 3, $c$ has a value from 0 to 2, and $Y^-$ is an anion, and a polyvinyl aromatic compound copolymerizable with styrene, said copolymer forming a continuous unfractured matrix in gel relationship with a continuous phase of a liquid.

7. A method of forming solid insoluble polyelectrolytes comprising copolymerizing the monomers in a mixture of monomers consisting essentially of a compound having the structure

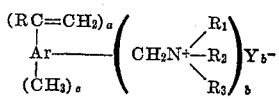

where Ar is an aromatic hydrocarbon selected from the group consisting of benzene, naphthalene and diphenyl, R is a substituent selected from the group consisting of hydrogen and methyl, $R_1$, $R_2$, and $R_3$ are selected from the group consisting of hydrogen, hydrocarbon and hydroxyl substituted aliphatic hydrocarbon groups, $a$ is an integer of from 1 to 2, $b$ is an integer of 1 to 3, $Y^-$ is an anion, and $c$ has a value from 0 to 2, and at least one compound selected from the group consisting of divinyl benzene, di-isopropenyl benzene and ethylene glycol dimethacrylate.

8. The product of the process of claim 7.

9. A method of forming a soluble polyelectrolyte which comprises polymerizing a monomer of the structure

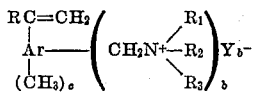

where Ar is an aromatic hydrocarbon selected from the group consisting of benzene, naphthalene and diphenyl, R is a substituent selected from the group consisting of hydrogen and methyl, $R_1$, $R_2$, and $R_3$ are selected from the group consisting of hydrogen, hydrocarbon and hydroxyl substituted aliphatic hydrocarbon groups, $b$ is an integer of 1 to 3, $Y^-$ is an anion, and $c$ has a value from 0 to 2.

References Cited in the file of this patent

UNITED STATES PATENTS

| | | |
|---|---|---|
| 2,516,971 | Galitzenstein | Aug. 1, 1950 |
| 2,591,573 | McBurney | Apr. 1, 1952 |
| 2,629,710 | McBurney | Feb. 24, 1953 |
| 2,631,127 | D'Alelio | Mar. 10, 1953 |

OTHER REFERENCES

Von Braun, Ber., 50, 45–9. (1917.)